(12) United States Patent
Shioi et al.

(10) Patent No.: US 6,248,303 B1
(45) Date of Patent: Jun. 19, 2001

(54) METHOD OF PRODUCING CUBIC BORON NITRIDE

(75) Inventors: Kousuke Shioi; Eiji Ihara, both of Shiojiri (JP)

(73) Assignee: Showa Denko Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/198,604

(22) Filed: Nov. 24, 1998

Related U.S. Application Data
(60) Provisional application No. 60/095,349, filed on Aug. 4, 1998.

(30) Foreign Application Priority Data

Nov. 25, 1997 (JP) .................................................. 9-323352

(51) Int. Cl.$^7$ .................................................. C01B 21/064
(52) U.S. Cl. .................................................. 423/290
(58) Field of Search .............................................. 423/290

(56) References Cited

U.S. PATENT DOCUMENTS

| 5,618,509 | 4/1997 | Shioi et al. | 423/290 |
| 5,837,214 | 11/1998 | Shioi et al. | 423/290 |

*Primary Examiner*—Wayne Langel
(74) *Attorney, Agent, or Firm*—Sughrue, Mion, Zinn, Macpeak & Seas, PLLC

(57) ABSTRACT hBN is converted to cBN by keeping it under temperature and pressure conditions within the range of stability of cubic boron nitride, in the presence of at least one compound selected from amides, imides and carbides of alkali metals and alkaline earth metals, as well as a silicon source and/or a boron source.

12 Claims, 1 Drawing Sheet

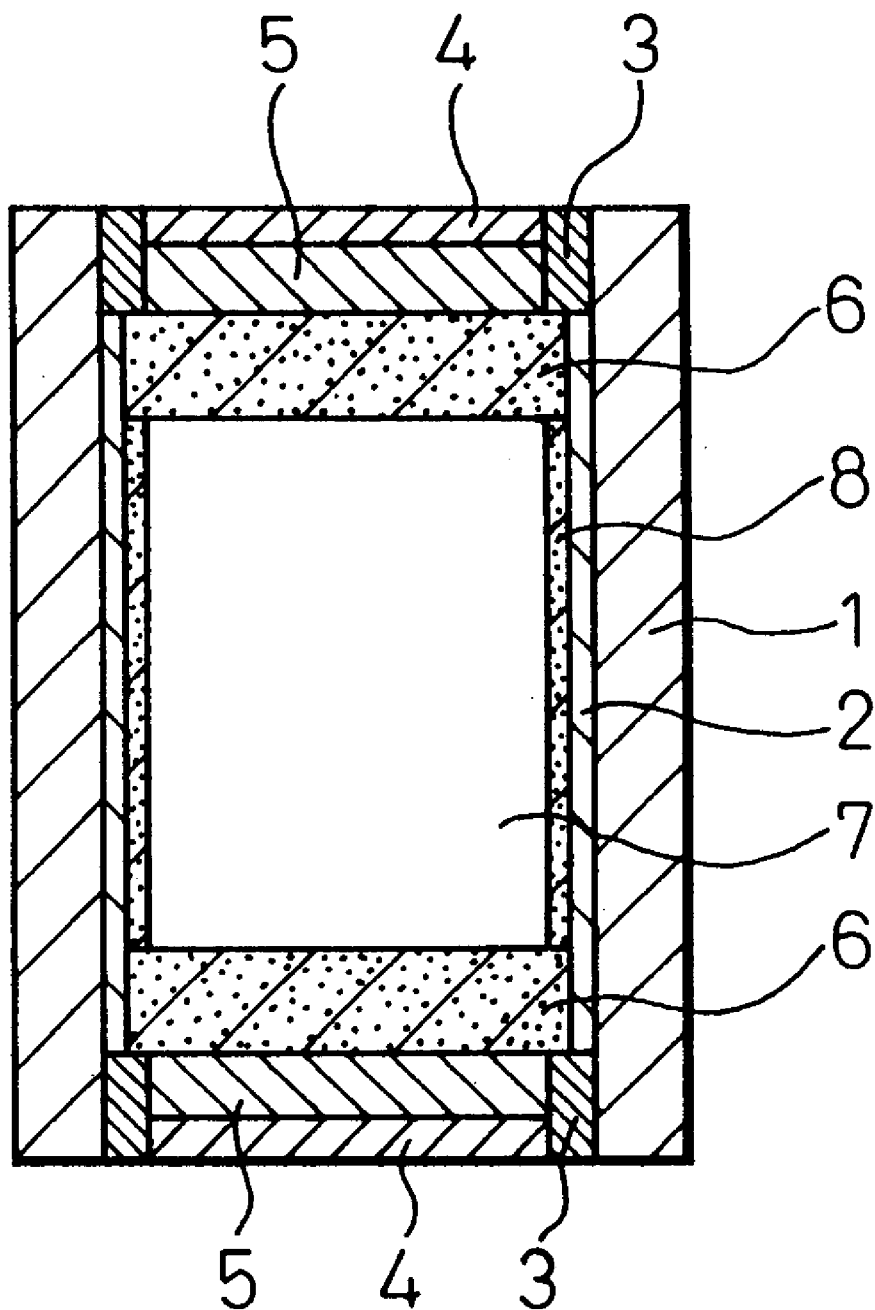

METHOD OF PRODUCING CUBIC BORON NITRIDE

CROSS REFERENCE TO RELATED APPLICATIONS

This application is an application filed under 35 U.S.C. §111(a) claiming benefit pursuant to 35 U.S.C. §119(e)(1) of the filing date of the Provisional Application No. 60/095,349, filed Aug. 4, 1998, pursuant to 35 U.S.C. §111(b).

BACKGROUND OF THE INVENTION

1. Field of the Invention

The present invention relates to an improved method of synthesizing cubic boron nitride from hexagonal boron nitride.

2. Description of the Related Art

Cubic boron nitride is second only to diamond in hardness but has a greater chemical stability and, therefore it is becoming increasingly more important as a grinding, polishing and cutting material. A variety of methods have been proposed for producing cubic boron nitride, but the most well-known of these, which is widely used industrially, is a method of converting hexagonal boron nitride to cubic boron nitride under high-temperature, high-pressure conditions of about 4.5–6.0 GPa and about 1400–1600° C. in the presence of a solvent (catalyst). The well-known solvents (catalysts) for this method have conventionally been nitrides and boronitrides of alkali metals and alkaline earth metals. (see, for example, U.S. Pat. No. 3,772,428).

Nevertheless, the cubic boron nitrides obtained by use of said solvents (catalysts) have problems of low toughness and heat resistance, resulting in breakage of abrasives or of significant decrease in the strength of abrasives when exposed to high temperature. Also, the cubic boron nitrides obtained by use of said solvents (catalysts) have irregular shapes or nearly spherical shapes and are poor in the development of euhedral planes.

SUMMARY OF THE INVENTION

The above problems can be solved in accordance with the present invention by providing a method for producing cubic boron nitride which is characterized by keeping hexagonal boron nitride under temperature and pressure conditions within the range of stability of cubic boron nitride, (1) in the presence of (i) at least one compound selected from the group consisting of amides, imides and carbides of alkali metals and alkaline earth metals and (ii) a silicon source; or (2) in the presence of (i) at least one compound selected from the group consisting of amides and imides of alkali metals and alkaline earth metals, (ii) at least one selected from the group consisting of carbides of alkali metals and alkaline earth metals and (iii) a boron source; or (3) in the presence of (i) at least one compound selected from the group consisting of amides, imides and carbides of alkali metals and alkaline earth metals, (ii) a silicon source and (iii) a boron source, to convert the hexagonal boron nitride to cubic nitride.

(1) In the presence of (i) at least one compound selected from the group consisting of amides, imides and carbides of alkali metals and alkaline earth metals and (ii) a silicon source, the obtained cubic boron nitride has an improved toughness and heat resistance. (2) In the presence of (i) at least one compound selected from the group consisting of amides and imides of alkali metals and alkaline earth metals, (ii) at least one selected from the group consisting of carbides of alkali metals and alkaline earth metals and (iii) a boron source, the obtained cubic boron nitride has sharp edges with developed euhedral planes and is excellent in its cutting ability. (3) In the presence of at least one compound selected from the group consisting of amides, imides and carbides of alkali metals and alkaline earth metals, (ii) a silicon source and (iii) a boron source, the obtained cubic boron nitrides has both an improved toughness and heat resistance as well as an improved cutting ability.

The hexagonal boron nitride used as the starting material may be commercially available hexagonal boron nitride powders. Since oxygen impurities contaminated in the form of boron oxide or the like may retard conversion of the hexagonal boron nitride to cubic boron nitride, the starting materials with a less oxygen content are desired. The particle size of the hexagonal boron nitride is not particularly limited, but 150 mesh or less is generally preferred. If the particle size is too large, the reactivity with the solvent (catalyst) may be lowered.

The carbides, amides and imides of alkalimetals, alkaline earth metals are also preferably those having a low content of oxygen, which is similar to the hexagonal boron nitride of the starting material. The particle size is not particularly limited but 1 mm or less is generally preferred. If the particle size of these compounds is too large, the reactivity with the hexagonal boron nitride is lowered.

The amides and imides of alkali metals and alkaline earth metals used in the present invention are basically $LiNH_2$, $NaNH_2$, $KNH_2$, $RbNH_2$, $CsNH_2$, $Li_2NH$, $Na_2NH$, $K_2NH$, $Rb_2NH$, $Cs_2NH$, $Be(NH_2)_2$, $Mg(NH_2)_2$, $Ca(NH_2)_2$, $Sr(NH_2)_2$, $Ba(NH_2)_2$, $BeNH$, $MgNH$, $CaNH$, $SrNH$, $BaNH$, etc., and the carbides of alkali metals and alkaline earth metals used in the present invention are basically $Li_2C_2$, $Na_2C_2$, $K_2C_2$, $Rb_2C_2$, $CS_2C_2$, $Be_2C$, $BeC_2$, $MgC_2$, $Mg_2C_3$, $CaC_2$, $SrC_2$, $BaC_2$, etc., but solid solutions, complex compounds, non-stoichiometric compounds, etc. of the above compounds may be also used to obtain similar effects.

The silicon source and the boron source used may be Si, $B_4Si$, $Si_3N_4$, B, $B_4C$, SiC, metal suicides, metal silicofluorides, metal silicohydrides, metal siliconitrides, organic silicon compounds, metal borosilicides, metal borofluorides, metal borohydrides, ammonium borofluorides, ammonium silfluorides, etc.

Preferable compounds as the amides, imides and carbides of alkali metals and alkaline earth metals are amides, imides and carbides of Li, Mg and Ca. The amides, imides and carbides of alkali metals and alkaline earth metals other than Li, Mg and Ca allow conversion of hexagonal boron nitride to cubic boron nitride only at a temperature and pressure higher than those in the case of the amides, imides and carbides of Li, Mg or Ca. The cubic boron nitride obtainable by using amides, imides or carbides of Li, Mg or Ca is more excellent in grinding ratio and required power for grinding than that obtainable by the other amides, imides or carbides.

Preferable combinations of at least one first compound of amides and imides of alkali metals and alkaline earth metals with at least one second compound of carbides of alkali metals and alkaline earth metals are combinations of at least one amide and/or imide of Li, Mg and/or Ca with at least one carbide of Li, Mg and/or Ca. The amides, imides and carbides of alkali metals and alkaline earth metals other than Li, Mg and Ca allow conversion of hBN to cBN only at a temperature and pressure higher than those in the case of amide or imide or carbide of Li, Mg or Ca. The cBN obtainable by using an amide, imide or carbide of alkali and alkaline earth metals other than Li, Mg and Ca has a grinding ratio and a required power for grinding interior to those obtainable by an amide, imide or carbide of Li, Mg or Ca to some extent.

A particularly preferable combination is $LiNH_2$ with $CaC_2$. This combination allows a cubic boron nitride with less defects and excellent in its transparency to be obtained, by which a cubic boron nitride with particularly excellent properties due to added silicon source and boron source can be obtained under relatively low temperature and pressure conditions.

Preferred silicon and boron sources are Si and B. These are easy to handle and are available and have a high reactivity, providing the desired effects in a relatively short reaction time.

The present invention is characterized by conducting conversion of hBN to cBN (1) in the presence of (i) at least one compound selected from the group consisting of amides, imides and carbides of alkali metals and alkaline earth metals and (ii) a silicon source, or (2) in the presence of (i) at least one compound selected from the group consisting of amides and imides of alkali metals and alkaline earth metals, (ii) at least one selected from the group consisting of carbides of alkali metals and alkaline earth metals and (iii) a boron source, or (3) in the presence of (i) at least one compound selected from the group consisting of amides, imides and carbides of alkali metals and alkaline earth metals, (ii) a silicon source and (iii) a boron source. In accordance with this process of the present invention, hBN can be converted to cBN with excellent toughness and excellent heat resistance as well as with well developed euhedral planes and sharp edges and an excellent cutting action, as a result of the solvent (catalyst) effect of the above compound(s).

It is generally believed that the hBN reacts with various additives, functioning as a solvent, or catalyst, to promote the conversion to cBN, and it is likewise believed that the present invention also functions in the same manner.

The amount of the at least one compound selected from the amides, imides and carbides of alkali metals and alkaline earth metals used in the present invention is such that the total number of metal atoms making up the additive is 0.1–30 parts, and preferably 0.5–20 parts, to 100 parts by the number of boron atoms making up the hBN (the number of the hBN molecules). If the amount of the additive is less than 0.1 parts, the effect of the additive is not sufficient and production of cBN is lowered. If the amount of the additive is more than 30 parts, the resultant cBN includes inclusions consisting of some components of additives, lowering the abrasive performance.

The ratio of the at least one compound selected from carbides of alkali metals and alkaline earth metals to the at least one compound selected from amides and imides of alkali metals and alkaline earth metals is preferably 70:30 to 5:95, more preferably 50:50 to 5:95, based on the ratio of the metal atoms making up the respective compounds.

If the ratio of the at least one compound from carbides of alkali metals and alkaline earth metals to the at least one compound from amides and imides of alkali metals and alkaline earth metals is more than 70:30, the resultant cBN includes black inclusions, lowering the abrasive performance. If the ratio is below 5:95, the solvent (catalyst) effect of the at least one compound selected from the amides and imides of the alkali and alkaline earth metals is too high so that the resultant cBN particles are irregular in their shape and the abrasive performance thereof is lowered.

The amount of the silicon source is preferably 0.01 to 0.8 parts, more preferably 0.025 to 0.3 parts as the number of the silicon atoms, based on 100 parts of hexagonal boron nitride as the number of molecules. If the amount of the silicon source is less than 0.01 parts, the effect of addition of the silicon source is not sufficient. If the amount of the silicon source is more than 0.8 parts, the yield of the cubic boron nitride decreases.

The amount of the boron source is preferably 0.05 to 15 parts, more preferably 0.1 to 5 parts as the number of the boron atoms, based on 100 parts of hexagonal boron nitride as the number of molecule. If the amount of the boron source is less than 0.05 parts, the effect of addition of the boron is not sufficient. If the amount of the boron source is more than 15 parts, the yield of the cubic boron nitride decrease.

As a preferred mode of combining the above mentioned additives with the hexagonal boron nitride, their powders may be mixed together, but layers of the hexagonal boron nitride and the additives may also be arranged for alternate lamination in a reaction container.

Actually, the hBN and the additives are preferably compacted at about 1–2 $ton/cm^2$ pressure, either separately or after being filled into the reaction container. This will have an effect of improving the handleability of the crude powders while increasing the productivity by reducing the amount of shrinkage in the reaction container.

The above compact or laminate may be previously combined with fine particles of cubic boron nitride as a seed, by which crystal growth of cubic boron nitride is accelerated by the above added fine cBN particles as nuclei. This embodiment is included in the present invention. In this case, the seed particles may be coated with the additive(s) of the carbide, amide and/or imide of the present invention.

The reaction container may be a high-temperature, high-pressure generator capable of maintaining crude powders (hBN and additives) or their compacts, etc. under conditions of temperature and pressure in the range of stability of cBN. This range of stability (temperature and pressure) is reported in P. Bundy, R. H. Wentorf, J. Chem. Phys. 38(5), pp. 1144–1149, (1963), and in most cases a minimum temperature and pressure of 1100° C. and 3.8 GPa are effective; however, this will vary depending on the types and combination of the additives (solvent, catalyst). The retention time is not particularly limited and should be enough to allow the desired conversion rate to be attained, but in most cases it is from about one second to 6 hours.

The hBN is converted to cBN by being kept in the above mentioned stability range, and if the temperature and pressure conditions are extremely high a conversion rate close to 100% may be attained; however, a composite lump comprising a mixture of hBN and cBN is usually obtained.

The composite lump is crushed to isolate the cBN. The method used for the isolation may be the one described in Japanese Examined Patent Publication (Kokoku) No. 49-27757, wherein, for example, the composite lump is crushed to a size of 5 mm or smaller, preferably 1 mm or smaller, after which sodium hydroxide and a small amount of water are added thereto and heating is effected to about 300° C. to selectively dissolve the hBN and often cooling, acid cleaning and filtration, the cBN is obtained.

BRIEF DESCRIPTION OF THE DRAWINGS

FIG. 1 shows a sectional view of a reaction container used for converting hBN to cBN in the Examples.

EXAMPLES

Various additives or elemental metals were added to hexagonal boron nitride with a granularity of 150 mesh or lower and containing, as impurities, 0.8 wt % of oxygen and 0.2 wt % of a metal impurity other than an alkali metal or alkaline earth metal, in the amount as shown in the following table. The amounts of the additive shown in the table are the ratio of the total number of the metal atoms making up the added additive or elemental metal to 100 parts by the number of hexagonal boron nitride molecules. This mixture was subjected to 1.5 ton/cm² pressure to make a 26 mmφ×32 mmh compact, which was kept in the reaction container shown in FIG. 1.

In the reaction container shown in FIG. 1, the outer wall 1 of the container is made of pyrophyllite as a pressure conveyor, and is a cylindrically shaped, while the inner side thereof is provided with a heater 2 consisting of a graphite cylinder and pyrophyllite 8 as a partitioning material. Also, the top and bottom ends of the container are each provided with a conducting steel ring 3 and a conducting steel plate 4, while the inner sides thereof are provided with a sintered alumina plate 5 and pyrophyllite 6 as a pressure conveyor, and the space surrounded by this pyrophyllite 6 and the pyropyllite 8 as a partitioning material is used as the holding compartment 7 for holding the raw materials for the reaction.

The above mentioned compact was treated for 10 minutes in this reaction container, under conditions as shown in the table.

The cubic boron nitride may be isolated (purified) by adding sodium hydroxide and a small amount of water to the specimen prepared by crushing to about 1 mm or less in a mortar or the like, heating it to 300° C., following this with cooling, cleaning with distilled water and hydrochloric acid and filtration, and then drying the filtered residue.

The obtained cubic boron nitrides were screened to a grit size fraction 120/140 under JIS-B4130 and the toughness index and thermal toughness index thereof were measured.

The "toughness index" is defined as below: a certain amount of grit which has passed a 139 μm-mesh screen and was retained on a 107 μm-mesh screen, corresponding the grit size 120/140, is put together with a steel ball in a 2 ml-capsule and subjected to milling for a certain time period (30.0±0.3 seconds), followed by screening with a 90 μm-mesh screen. The amount of the grit remained on the 90 μm-mesh screen is expressed as a weight percent based on the starting grit.

The "thermal toughness index" is defined as the toughness index as measured above after the sample is heated in air at 1050° C. for 1 hour followed by washing with a dilute hydrochloric acid and drying.

The higher the measured "toughness index", the higher is the toughness of the abrasive. The higher the measured "thermal toughness index", the higher is the heat resistance of the abrasive.

Using the obtained cubic boron nitrides, vitreous bond grinding wheels were manufactured. The grinding wheels had the following compositions and shapes:

| | |
|---|---|
| Grit size of cBN | #120/140 |
| Concentration | 100 (rate of grinding wheel 25 vol %) |
| Porosity | 30 vol % |
| Percentage of bond | 25 vol % |
| Filler (white alundum WA #220) | 30% |
| Shape of grinding wheel | 205 mmφ and 5 mmU 76.2 H |

The cubic boron nitride was mixed with borosilicate glass and a filler, formed into a shape of about 5 mm×3 mm×30 mm and fired in air at 1050° C. for 10 hours. The fired bodies were bonded to the periphery of an aluminum wheel to obtain a grinding wheel.

Grinding tests were conducted for the obtained grinding wheels by using a surface grinder under the following conditions:

| | |
|---|---|
| Wet surface traverse grinding | |
| Peripheral speed of grinding wheel | 1500 m/min |
| Table speed | 15 m/min |
| Cross feed rate | 2 mm/pass |
| Depth setting | 20 μm |
| Ground material | SKH-51 |

The grinding ratio (stock removal/grinding wheel wear) and the power used therefore were measured and are shown in the following table.

A portion of the obtained converted lump was crushed in a mortar, and an X-ray powder diffraction instrument was used to determine the conversion rate to cubic boron nitride from the intensity ratio of the diffracted rays of the cubic boron nitride (111) and the hexagonal boron nitride (002) using CuK α-rays, and the conversion rate was determined.

TABLE

| Example No. | Additives | Ratio of combination | Synthesis conditions | Conversion rate | Toughness index | Thermal Toughness index | G ratio | Power |
|---|---|---|---|---|---|---|---|---|
| Ex. 1 | LiNH$_2$—CaC$_2$—Si | 5-2-0.01 | 4.0 GPa-1320° C. | 47 | 84 | 80 | 903 | 701 |
| Ex. 2 | LiNH$_2$—CaC$_2$—Si | 5-2-0.025 | 4.0 GPa-1320° C. | 46 | 96 | 89 | 1092 | 763 |
| Ex. 3 | LiNH$_2$—CaC$_2$—Si | 5-2-0.05 | 4.0 GPa-1320° C. | 53 | 95 | 90 | 1057 | 776 |
| Ex. 4 | LiNH$_2$—CaC$_2$—Si | 5-2-0.3 | 4.0 GPa-1320° C. | 51 | 91 | 86 | 1099 | 764 |
| Ex. 5 | LiNH$_2$—CaC$_2$—Si | 5-2-0.5 | 4.0 GPa-1320° C. | 36 | 93 | 87 | 1096 | 793 |
| Ex. 6 | LiNH$_2$—CaC$_2$—Si | 5-2-0.8 | 4.0 GPa-1320° C. | 22 | 93 | 89 | 1056 | 760 |
| Ex. 7 | LiNH$_2$—CaC$_2$—B | 5-2-0.05 | 4.0 GPa-1320° C. | 49 | 82 | 74 | 930 | 721 |
| Ex. 8 | LiNH$_2$—CaC$_2$—B | 5-2-0.1 | 4.0 GPa-1320° C. | 54 | 81 | 72 | 972 | 675 |
| Ex. 9 | LiNH$_2$—CaC$_2$—B | 5-2-1.5 | 4.0 GPa-1320° C. | 46 | 79 | 75 | 985 | 691 |
| Ex. 10 | LiNH$_2$—CaC$_2$—B | 5-2-5 | 4.0 GPa-1320° C. | 43 | 75 | 71 | 984 | 698 |

TABLE-continued

| Example No. | Additives | Ratio of combination | Synthesis conditions | Conversion rate | Toughness index | Thermal Toughness index | G ratio | Power |
|---|---|---|---|---|---|---|---|---|
| Ex. 11 | $LiNH_2$—$CaC_2$—B | 5-2-10 | 4.0 GPa-1320° C. | 31 | 76 | 71 | 964 | 677 |
| Ex. 12 | $LiNH_2$—$CaC_2$—B | 5-2-15 | 4.0 GPa-1320° C. | 19 | 80 | 76 | 938 | 685 |
| Ex. 13 | $LiNH_2$—$CaC_2$—Si—B | 5-2-0.05-1.5 | 4.0 GPa-1320° C. | 48 | 96 | 91 | 1056 | 688 |
| Ex. 14 | $LiNH_2$—Si—B | 10-0.05-1.5 | 4.5 GPa-1350° C. | 37 | 70 | 67 | 901 | 661 |
| Ex. 15 | $CaC_2$—Si—B | 10-0.05-1.5 | 4.6 GPa-1360° C. | 35 | 74 | 69 | 930 | 684 |
| Ex. 16 | $MgC_2$—Si—B | 10-0.05-1.5 | 4.5 GPa-1350° C. | 43 | 74 | 68 | 927 | 669 |
| Ex. 17 | $LiNH_2$—$Mg(NH_2)_2$—Si—B | 5-2-0.05-1.5 | 4.0 GPa-1320° C. | 53 | 76 | 69 | 937 | 662 |
| Ex. 18 | $Li_2NH$—$CaC_2$—Si—B | 5-2-0.05-1.5 | 4.0 GPa-1320° C. | 42 | 96 | 90 | 1075 | 673 |
| Ex. 19 | $Li_2C_2$—$Ca(NH_2)_2$—Si—B | 5-2-0.05-1.5 | 4.0 GPa-1320° C. | 47 | 97 | 91 | 1066 | 655 |
| Com. Ex. 1 | $Li_3N$ | 10 | 4.7 GPa-1370° C. | 39 | 54 | 48 | 486 | 1018 |
| Com. Ex. 2 | $Li_3BN_2$ | 10 | 4.7 GPa-1370° C. | 33 | 61 | 54 | 445 | 1040 |
| Com. Ex. 3 | $Ca_3B_2N_4$ | 10 | 4.7 GPa-1370° C. | 44 | 64 | 54 | 453 | 975 |
| Com. Ex. 4 | Mg | 10 | 4.7 GPa-1370° C. | 38 | 55 | 46 | 404 | 994 |

What is claimed is:

1. A method for producing cubic boron nitride comprising keeping hexagonal boron nitride under temperature and pressure conditions within the range of stability of cubic boron nitride, (1) in the presence of (i) at least one compound selected from the group consisting of amides, imides and carbides of alkali metals and alkaline earth metals and (ii) a silicon source; or (2) in the presence of (i) at least one compound selected from the group consisting of amides, imides and carbides of alkali metals and alkaline earth metals, (ii) a silicon source and (iii) a boron source, to convert the hexagonal boron nitride to cubic boron nitride.

2. The method according to claim 1, wherein said at least one compound selected from the group consisting of the amides, imides and carbides is used such that the total number of metal atoms making up said at least one compound is in a range of 0.1–30 parts to 100 parts by the number of molecules of the hexagonal boron nitride.

3. The method according to claim 2, wherein said at least one compound selected from the group consisting of the amides, imides and carbides is used such that the total number of the metal atoms making up said at least one compound is in a range of 0.5 to 20 parts to 100 parts by the number of molecules of the hexagonal boron nitride.

4. The method according to claim 1, wherein the ratio of said at least one carbides to said at least one amides and/or imides is from 70:30 to 5:95, based on the total numbers of the metal atoms making up the compounds.

5. The method according to claim 4, wherein the ratio of said at least one carbide to said at least one amides and/or imides is from 50:50 to 5:95, based on the total numbers of the metal atoms making up the compounds.

6. The method according to claim 1, wherein said silicon source is used such that the total number of silicon atoms making up the silicon source is in a range of 0.01 to 0.8 part to 100 parts by the number of molecule of the hexagonal boron nitride.

7. The method according to claim 6, wherein said silicon source is used such that the total number of silicon atoms making up the silicon source is in a range of 0.025 to 0.3 part to 100 parts by the number of molecule of the hexagonal boron nitride.

8. The method according to claim 1, wherein said boron source is used such that the total number of boron atoms making up the boron source is in a range of 0.1 to 5 parts by the number of molecule of the hexagonal boron nitride.

9. A method according to claim 1, wherein said region of stability of cubic boron nitride is selected to have a temperature of 1100° C. or higher and a pressure of 3.8 GPa or higher.

10. A method according to claim 1, wherein a lump comprising the converted cubic boron nitride and the unconverted hexagonal boron nitride is obtained and the lump is crushed, after which sodium hydroxide and water are added thereto and heating is effected to selectively dissolve the hexagonal boron nitride, and then cooling, acid cleaning and filtration are conducted, so as to isolate the cubic boron nitride.

11. A method according to claim 1, wherein said at least one compound is selected from the group consisting of lithium amides, lithium imides, lithium carbides, magnesium amides, magnesium imides, magnesium carbides, calcium amides, calcium imides and calcium carbides.

12. A method according to claim 1, wherein a combination of $LiNH_2$ and $CaC_2$ is used, as said at least one compound.

* * * * *